United States Patent
Feng et al.

(10) Patent No.: US 11,157,640 B2
(45) Date of Patent: Oct. 26, 2021

(54) PROTECTING SENSITIVE DATA IN SOFTWARE PRODUCTS AND IN GENERATING CORE DUMPS

(71) Applicant: International Business Machines Corporation, Armonk, NY (US)

(72) Inventors: Rui Feng, Beijing (CN); Shuang Shuang Jia, Beijing (CN); Da Fei Shi, Beijing (CN); Lijun Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 16/653,670

(22) Filed: Oct. 15, 2019

(65) Prior Publication Data
US 2020/0042729 A1 Feb. 6, 2020

Related U.S. Application Data

(63) Continuation of application No. 15/835,630, filed on Dec. 8, 2017, now Pat. No. 10,496,839, which is a
(Continued)

(30) Foreign Application Priority Data

Feb. 28, 2014 (CN) .......................... 201410072282.6

(51) Int. Cl.
*G06F 21/62* (2013.01)
*G06F 8/54* (2018.01)
(Continued)

(52) U.S. Cl.
CPC ............ *G06F 21/6209* (2013.01); *G06F 8/54* (2013.01); *G06F 11/0706* (2013.01);
(Continued)

(58) Field of Classification Search
CPC .......... G06F 21/6209; G06F 8/54; G06F 8/41; G06F 11/0706; G06F 11/0778; G06F 11/366
See application file for complete search history.

(56) References Cited

U.S. PATENT DOCUMENTS

| | | |
|---|---|---|
| 5,058,164 A | 10/1991 | Elmer et al. |
| 5,193,180 A | 3/1993 | Hastings |

(Continued)

FOREIGN PATENT DOCUMENTS

| | | |
|---|---|---|
| CN | 101308471 A | 11/2008 |
| CN | 105694649 A | 9/2012 |
| WO | WO2013117896 | 8/2013 |

OTHER PUBLICATIONS

Broadwell, Pete et al., "Scrash: A System for Generating Secure Crash Information," SSYM '03 Proceedings of the 12th Conference on USENIX Security Symposium, vol. 12, Aug. 2003, 12 pages.
(Continued)

*Primary Examiner* — Kristine L Kincaid
*Assistant Examiner* — Alexander R Lapian
(74) *Attorney, Agent, or Firm* — Heslin Rothernberg Farley & Mesiti P.C.; Teddi Maranzano, Esq.

(57) ABSTRACT

Sensitive data is protected in a software product. A source file of the software product is compiled to generate an object file, in which the source file includes at least one piece of sensitive data marked with a specific identifier. The object file has a secure data section for saving storage information of the at least one piece of sensitive data at compile-time and run-time. The object file is linked to generate an executable file. The executable file updates the secure data section at run-time. Sensitive data is also protected when a core dump is generated.

20 Claims, 5 Drawing Sheets

Related U.S. Application Data continuation of application No. 14/632,114, filed on Feb. 26, 2015, now Pat. No. 9,852,303.

(51) Int. Cl.
*G06F 11/36* (2006.01)
*G06F 11/07* (2006.01)
*G06F 8/41* (2018.01)

(52) U.S. Cl.
CPC ........ *G06F 11/0778* (2013.01); *G06F 11/366* (2013.01); *G06F 8/41* (2013.01)

(56) References Cited

U.S. PATENT DOCUMENTS

| | | | |
|---|---|---|---|
| 6,983,463 B1 | 1/2006 | Hunt | |
| 7,272,832 B2 | 9/2007 | Gardner | |
| 7,484,060 B2 | 1/2009 | Kelly et al. | |
| 7,725,739 B2 | 5/2010 | Lelikov | |
| 7,895,124 B2 | 2/2011 | Beratti et al. | |
| 8,060,757 B2 | 11/2011 | Goettfert et al. | |
| 8,190,914 B2 | 5/2012 | van Riel et al. | |
| 8,510,523 B2 | 8/2013 | Szegedi et al. | |
| 8,627,148 B2 | 1/2014 | Li et al. | |
| 9,390,116 B1 | 7/2016 | Li et al. | |
| 9,852,303 B2 | 12/2017 | Feng et al. | |
| 2006/0126836 A1 | 6/2006 | Rivas | |
| 2008/0126301 A1* | 5/2008 | Bank | G06F 11/366 |
| 2009/0172409 A1 | 7/2009 | Bullis et al. | |
| 2009/0307783 A1 | 12/2009 | Maeda et al. | |
| 2009/0327750 A1 | 12/2009 | Wu et al. | |
| 2010/0106645 A1 | 4/2010 | Peckover | |
| 2011/0153689 A1 | 6/2011 | Hall et al. | |
| 2013/0055025 A1 | 2/2013 | Feix et al. | |
| 2013/0282951 A1* | 10/2013 | Kuo | G06F 21/575 711/102 |
| 2013/0290645 A1 | 10/2013 | Van De Ven | |
| 2016/0232187 A1 | 8/2016 | Aoki | |
| 2018/0101692 A1 | 4/2018 | Feng et al. | |

OTHER PUBLICATIONS

Viega, John, Protecting Sensitive Data in Memory, Feb. 2001, 6 pages http://www.cgisecurity.com/lib/protecting-sensitive-data.html.

List of IBM Patents or Patent Applications treated as Related, Nov. 13, 2019, 2 pages.

* cited by examiner

| Header | Identifier | Amount of storage information | Back pointer to the header | |
|---|---|---|---|---|
| Record section | Data type | Memory address | Address offset | Length |
| | ... | | | |
| | ... | | | |

PROTECTING SENSITIVE DATA IN SOFTWARE PRODUCTS AND IN GENERATING CORE DUMPS

PRIOR FOREIGN APPLICATION

This application claims priority from Chinese patent application number 201410072282.6, filed Feb. 28, 2014, which is hereby incorporated herein by reference in its entirety.

BACKGROUND

One or more aspects relate to sensitive data protection technology, and more particularly, to protecting sensitive data in a software product to avoid sensitive data leak during core dumps.

Most of the existing operating systems and software products support a core dump mechanism. When a software product crashes during running, the operating system generates a core dump and creates a core dump file. The core dump file saves the data in the memory at the crash point, which helps in troubleshooting. It is understood that the crash problem is very hard to reproduce in the test environment since such problem may depend on some special data of the running environment. The core dump file can truly record the state of the computer's memory when a crash happens. Therefore, the data in the core dump file is very helpful for developers to debug the software product. In many cases, debugging the core dump file is the most efficient method to find out the root causes and accordingly solve the crash problem. In this sense, the core dump mechanism is useful for developing and debugging the software product.

On the other hand, the data in the memory is fully recorded during the core dump process, so the core dump file may contain sensitive data, especially in the case that the software product is for a finance related system or a security related system. When the software product provider requires a core dump file for debugging, the software product user is often concerned about sensitive data leak.

Software product providers, especially some system level software providers, hope to reduce the risk of exposing the sensitive data when the core dump happens. This requires the software product developers to release or remove data structures or data variants associated with sensitive data in the memory.

Some software providers may also provide other methods to help debug different problems. These methods also dump some structures and caches in the memory to a file. For example, some operating systems use a core trace program for problem debugging, which writes some trace entries as defined by the developers to the trace buffer. While the trace is recycled, the content in the trace buffer is formatted to the readable trace report file. In addition, the other software products running on the operating system also use the trace mechanism to dump the data in the memory to readable text files. If the software product user worries about exposure of sensitive data and does not want to provide enough debug data, it will make debugging the problem more difficult or impossible.

So it is desired to protect the sensitive data in the software product, so as to avoid sensitive data leak during the core dump.

SUMMARY

Embodiments of the present invention provide a method and device for protecting sensitive data in a software product, and a method and device for protecting sensitive data when a core dump is generated.

According to one aspect of the present invention, there is provided a method of protecting sensitive data in a software product, which includes compiling a source file of the software product to generate an object file, wherein the source file includes at least one piece of sensitive data marked with a specific identifier, and the object file has a secure data section for saving storage information of the at least one piece of sensitive data at compile-time and run-time; and linking the object file to generate an executable file, wherein the executable file is to update the secure data section at run-time.

According to another aspect of the present invention, there is provided a method of protecting sensitive data when a core dump is generated, which includes scanning a memory of a computer to find a secure data section in the memory, wherein the secure data section saves storage information of the sensitive data; acquiring the sensitive data according to the storage information of the sensitive data in the found secure data section; processing the sensitive data to hide the sensitive data; and generating a core dump file.

Devices, systems and/or computer program products for protecting sensitive data in a software product and/or when a core dump is generated may also be provided.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference number generally refers to the same components in the embodiments of the present disclosure.

DETAILED DESCRIPTION

Embodiments are described in more detail with reference to the accompanying drawings, in which embodiments of the present disclosure have been illustrated. However, aspects of the present disclosure can be implemented in various ways, and thus, should not be construed to be limited to the embodiments disclosed herein. On the contrary, the embodiments are provided for a thorough and complete understanding of aspects of the present disclosure.

Figure 1:
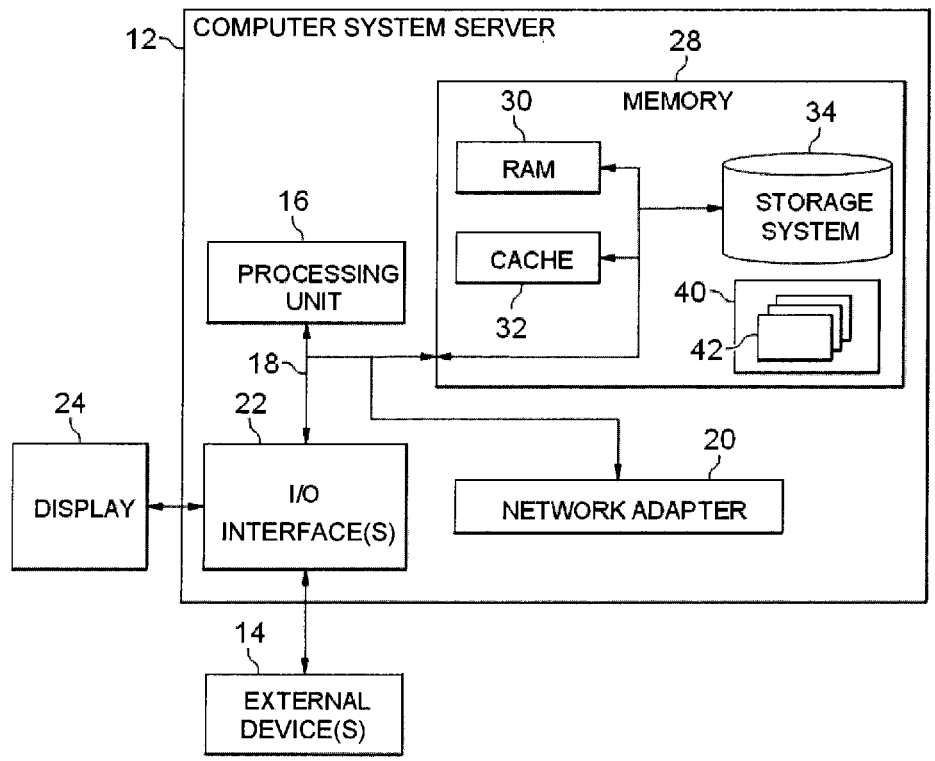
FIG. 1 shows a diagram of an exemplary computer system/server, which is applicable to implement one or more embodiments of the present invention.

Referring now to FIG. 1, an exemplary computer system/server 12, which is applicable to implement embodiments of the present invention, is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA), and the Peripheral Component Interconnect (PCI).

Computer system/server 12 typically includes a variety of computer system readable media. Such media may be any available media that is accessible by computer system/server 12, including both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 18 by one or more data media interfaces. As is further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with other components of computer system/server 12 via bus 18. It is understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

Figure 2:
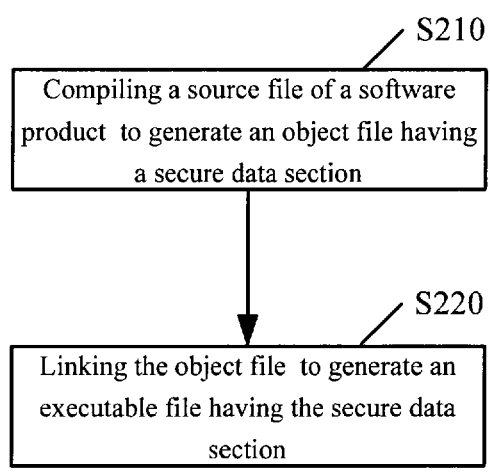
FIG. 2 is one example of a flow chart of a method for protecting sensitive data in a software product according to an embodiment of the present invention.

FIG. 2 shows one example of a flow chart of a method for protecting sensitive data in a software product according to an embodiment of the present invention. Aspects of the embodiment are described in detail below in conjunction with the drawing.

A basic idea of the method according to one embodiment is that protection of sensitive data is implemented by marking the sensitive data and tracing the sensitive data at compile-time and run-time.

As shown in FIG. 2, in step S210, a source file of a software product is compiled to generate an object file, wherein the source file includes at least one piece of sensitive data marked with a specific identifier, and the generated object file has a secure data section for saving storage information of the sensitive data at compile-time and run-time.

Generally, only software product developers know exactly what data is sensitive data, and which data variables carry these sensitive data. Therefore, in one embodiment, a specific identifier is introduced to clearly mark the sensitive data in the source file, so that the sensitive data can be identified at compile-time. For example, the specific identifier may be a modifier indicating security (hereinafter called "a secure modifier"), which may be indicated by "secure". Of course, those skilled in the art understand that other ways may be used to mark the sensitive data.

In one example, the secure modifier may be set before a data type of the sensitive data in the source file. The secure modifier may be used to mark any data type of the sensitive data, for example, an elementary data type such as int, float, long, character, pointer, and so on, and a composite data type such as struct, array, list or function, and so on. When the secure modifier is used to mark the sensitive data of the composite data type, all the data included in the sensitive data is also marked as sensitive data. Table 1 shows several usage examples of the secure modifier.

| Example | Data type | Data type with secure modifier |
|---|---|---|
| 1 | Int | secure int |
| 2 | char * | secure char * |
| 3 | float[ ] | secure float [ ] |
| 4 | struct{<br>  int<br>  char *<br>} | secure struct{<br>  int<br>  char *<br>} |
| 5 | struct{<br>  int<br>  char *<br>} | struct{<br>  secure int<br>  char *<br>} |
| 6 | Void function ( ) {<br>  int<br>} | Secure void function( ){<br>  int<br>} |

As shown in Table 1, in Example 4, the secure modifier "secure" is set prior to "struct", so the struct data as well as the int data and the character data therein are all sensitive data. In Example 5, because the secure modifier "secure" is set prior to the int data, only the int data is sensitive data, while the character data and the struct data are not sensitive data.

Figure 3:
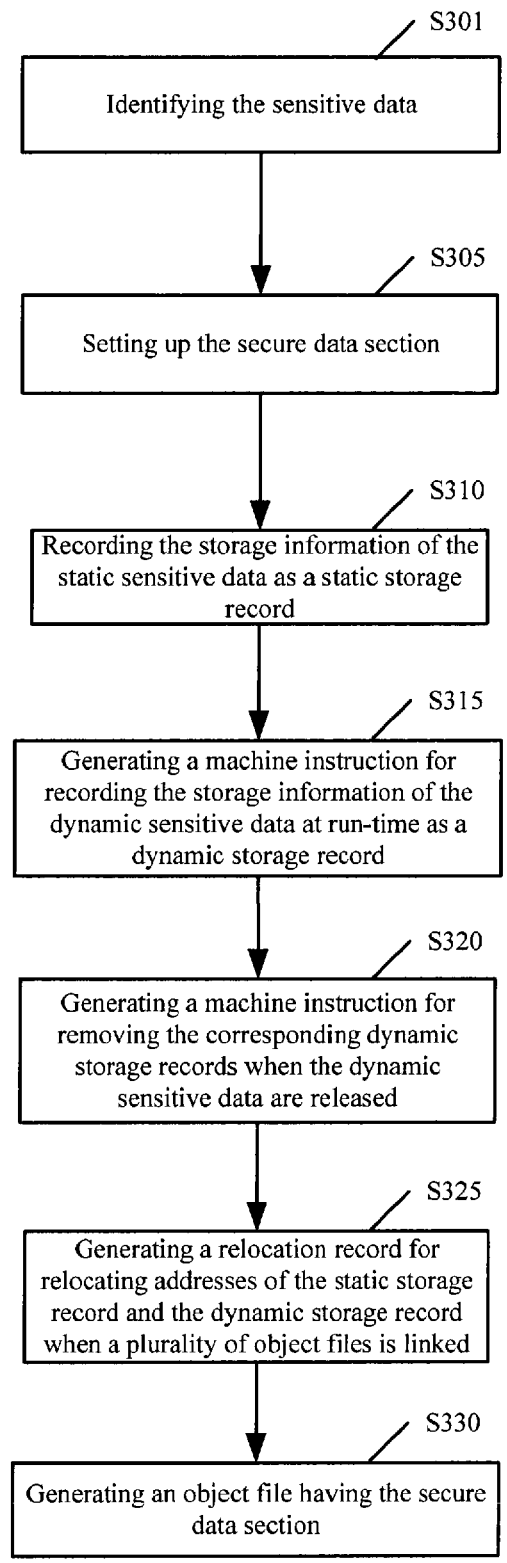
FIG. 3 is one example of a schematic flow chart of one example of the compiling process in the embodiment shown in FIG. 2.

FIG. 3 is a schematic flow chart of one example of the compiling process in the embodiment shown in FIG. 2. As shown in FIG. 3, in step S301, the sensitive data is identified from the source file based on the specific identifier (e.g., the secure modifier). As mentioned before, the sensitive data has been marked with the specific identifier. Therefore, at compile-time, it may be identified from the source file which data is the sensitive data with the specific identifier, for further processing.

Further, in addition to identifying the sensitive data directly marked with the specific identifier, the data associated with the sensitive data may also be identified from the source file as indirect sensitive data, according to the relationship between the sensitive data and other data or function parameters in the source file, even if the data is not marked with any specific identifier.

For example, in the case of a variable assignment, if the sensitive data is assigned to other data, the indirect sensitive data may be identified according to an Abstract Syntax Tree. For example, in the case of a function call, if the sensitive data is transmitted as parameters of a function, the indirect sensitive data may be identified according to the Abstract Semantics Tree. For another example, in the case of object inheritance, the sensitive data also has the inheritance.

Therefore, the indirect sensitive data may include any one of the following: the data assigned with the sensitive data, the data obtained by mathematical computation of the sensitive data, the data obtained by a function call with the sensitive data as parameters, and the data having an inheritance relationship with the sensitive data. By identifying the indirect sensitive data, all the data in the source file that needs to be protected may be fully obtained, thereby overcoming the problem in the prior art that the sensitive data is impossible to trace when the sensitive data changes, resulting in sensitive data leak.

Next, in step S305, a secure data section for saving storage information of the sensitive data at compile-time and run-time is set up. In one embodiment, in order to implement trace of the sensitive data, the secure data section is newly added to the object file. Furthermore, the secure data section also saves storage information of the indirect sensitive data.

Figure 4:
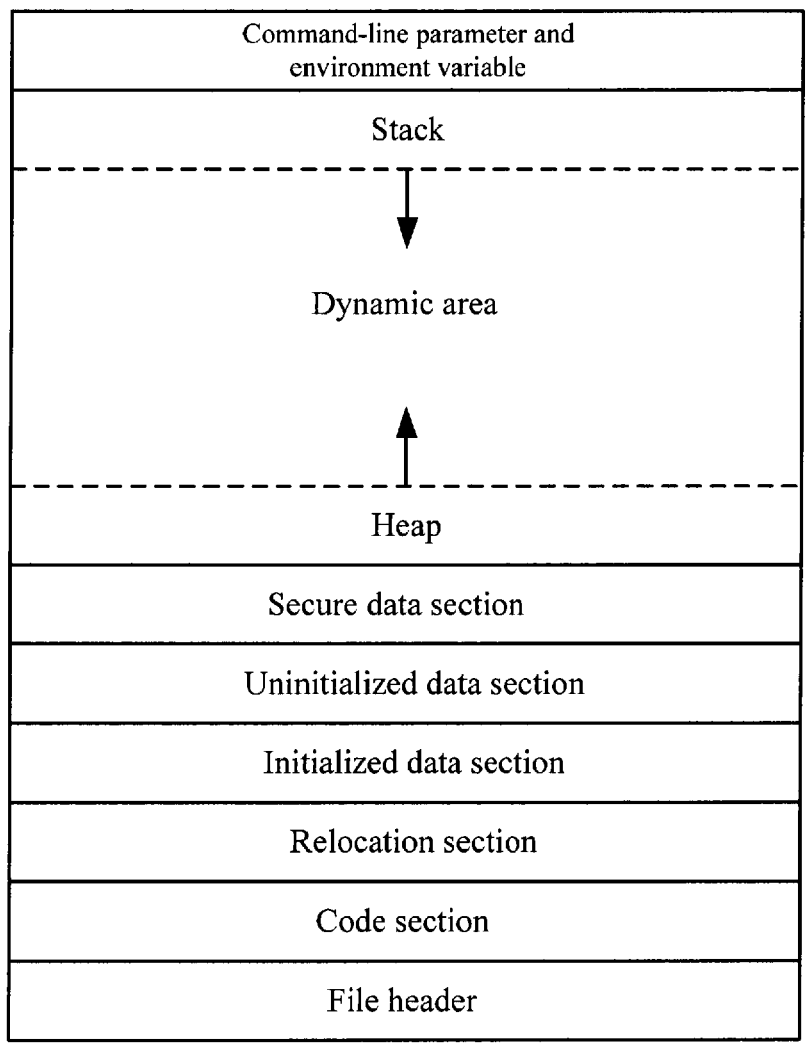
FIG. 4 is a schematic diagram for illustrating one example of an object file having a secure data section.

FIG. 4 is a schematic diagram for illustrating one example of an object file having a secure data section. As shown in FIG. 4, the object file typically has a file header, a code section, a relocation section, a data section (including an uninitialized data section and an initialized data section), a dynamic area (including a heap and a stack), etc. The file header contains pointers to every other section. The code section is used for storing the machine instructions generated by the compiling. The relocation section is used for storing content associated with relocation. The data section is a static section for storing static variables. The dynamic area is typically allocated at run-time, wherein the heap is growing upward, and the stack is growing downward. In step S305 (FIG. 3), the secure data section is set up. The secure data section may be set up at any location in the object file, for example, between the data section and the dynamic area (as shown in FIG. 4), or within the data section. The file header also includes a pointer to the secure data section. The secure data section may include a header and a record section following the header. An identifier of the secure data section is saved in the header, to identify the secure data section. The header also saves an amount of storage information of the sensitive data and the indirect sensitive data recorded in the record section and a back pointer to the file header.

Figures 5, 6:
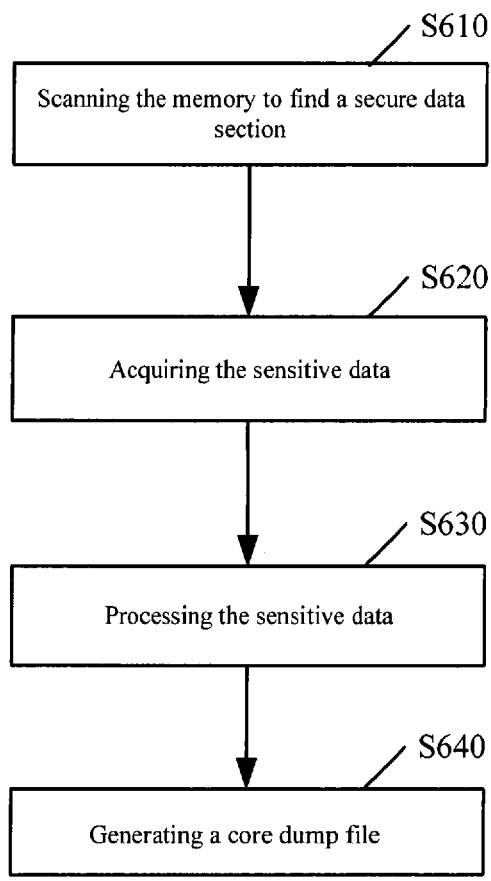
FIG. 5 is a schematic diagram for illustrating one example of a structure of a secure data section.
FIG. 6 is one example of a flow chart of a method for protecting sensitive data when generating a core dump according to an embodiment of the present invention.

In the record section, the storage information of the sensitive data or indirect sensitive data may be recorded in the form of an entry. Each entry records the storage information of a piece of sensitive data or indirect sensitive data. The storage information of the sensitive data or indirect sensitive data may contain a data type of the sensitive data or indirect sensitive data, a memory address of the sensitive data or indirect sensitive data and an address offset. The data type of the sensitive data or indirect sensitive data has been defined in the source file, and thus may be determined at compile-time. The memory address of the sensitive data or indirect sensitive data may either be the initial address of the sensitive data or indirect sensitive data in the memory, or the initial address of the section for saving the sensitive data or indirect sensitive data. The memory address is determined at different stages according to the variable types of the sensitive data or indirect sensitive data. The determination of the memory address of the sensitive data or indirect sensitive data is described later in detail. The address offset is an offset based on the memory address, which may be zero. The address of the sensitive data or indirect sensitive data in the memory is actually the sum of the above-mentioned memory address and the address offset. In addition, the storage information may also contain the length of the sensitive data or indirect sensitive data. FIG. 5 illustrates one example of a structure of the secure data section.

When the secure data section is set up, the address of the secure data section may be determined. In the object file, except for the dynamic area which is allocated at run-time, the addresses of the other sections may be determined at compile-time. The length of the secure data section consists of a fixed length and a dynamic length. The fixed length may be determined at compile-time, which is the sum of the length of the header of the secure data section and the length of the storage information saved in the record section at compile-time. The length of the storage information is the sum of the length of the data type, the length of the memory address, the length of the address offset and the length of the sensitive data. The storage information of some sensitive data may be saved in the secure data section only at run-time; therefore, the length of this part, which is called a "dynamic length," is not determined at compile-time. A certain amount of space may be reserved in the secure data section at compile-time, for saving the storage information of the sensitive data at run-time.

In the High Level Language used for coding the source file, the variables are divided into constants, global variables, local variables (also "stack variables") and user-allocated-memory variables (also "heap variables") based on different scopes of action. The constants and global variables are also known as "static variables", which are stored in the data section at compile-time. The local variables and the user-allocated-memory variables are also known as "dynamic variables", wherein the local variables are saved in the stack at run-time and the user-allocated-memory variables are saved in the heap at run-time. Accordingly, the sensitive data may also be divided into static sensitive data pertaining to static variables and dynamic sensitive data pertaining to dynamic variables. Similarly, the indirect sensitive data may also be divided into static indirect sensitive data and dynamic indirect sensitive data.

As the data type, memory address, address offset and length of the static sensitive data are known at compile-time and will not change, the storage information of the static sensitive data is recorded in the secure data section as a static storage record in step S310 (FIG. 3). An entry index may be established for the static storage record, and recorded. Further, the storage information of the static indirect sensitive data is recorded in the secure data section as the static storage record.

However, for the dynamic sensitive data, except for the data type and the length of the local variables which are known at compile-time, the memory address of the dynamic sensitive data, the address offset, and the length of the user-allocated-memory variables in the dynamic variables are known only at run-time. Therefore, an extra machine instruction is generated at compile-time to indicate tracing and recording the storage information of the dynamic sensitive data at run-time. Specifically, in step S315, a machine instruction for recording the storage information of the dynamic sensitive data into the secure data section at run-time is generated, wherein the recorded storage information of the dynamic sensitive data is regarded as the dynamic storage record. In order to record the storage information of the local variables and the user-allocated-memory variables, a stack address and a heap address are traced respectively. Further, for the dynamic indirect sensitive data, a machine instruction for recording the storage information of the dynamic indirect sensitive data as the dynamic storage record is also generated.

Furthermore, a machine instruction for removing the corresponding dynamic storage records when the dynamic sensitive data is released may also be generated in step S320. The dynamic variables are only used within their scope of action, and are released when they exceed the scope of action. Therefore, when the dynamic sensitive data is used within the scope of action, the dynamic sensitive data is saved in the dynamic section, and the storage information thereof is recorded in the secure data section. When the dynamic sensitive data is released from the dynamic section, the storage information thereof is removed from the secure data section. Further, a machine instruction for removing the corresponding dynamic storage records when the dynamic indirect sensitive data is released is generated for the dynamic indirect sensitive data.

In addition, a relocation record for relocating the addresses of the static storage record and the dynamic storage record in the secure data section when linking a plurality of object files may also be generated in step S325. When a plurality of object files is linked, the location of the secure data section changes. Correspondingly, the addresses of the static storage record and the dynamic storage record in the secure data section also change. Therefore, the secure data section is to be relocated at link-time.

Although it is described above in the order of steps S310, S315, S320 and S325, those skilled in the art may know that these steps may be executed in parallel or in other orders.

In the compiling of the source file, in addition to the above-mentioned operations associated with the sensitive data, other conventional compiling operations may also be performed, the description of which is omitted here. Finally, the object file having the secure data section is generated in step S330.

Returning to FIG. 2, after the object file having the secure data section is generated, the generated object file is linked to generate an executable file in step S220, wherein the generated executable file updates the secure data section at run-time.

In this step, it is first determined whether there is a plurality of object files to be linked. If there is only one object file, i.e. the object file having the secure data section generated in step S210, the object file is linked in the conventional way to generate the executable file having the secure data section. If there is a plurality of object files to be linked and at least one object file has the secure data section, the plurality of object files is merged.

When merged, the sections of the plurality of object files are merged respectively. In the case that two or more object files have secure data sections, the two or more secure data sections are merged to form a new secure data section. During the merging, the length of the new secure data section is calculated. Note that, since the global variables may be marked as sensitive data, the repeated global variables are eliminated when the length is calculated. In addition, the entry index of the new secure data section is re-established.

Then, the new secure data section in the merged object file is relocated. During the relocation, the address of the new secure data section is obtained. The address of the new secure data section may be determined according to the length of each section of the plurality of object files before merging. Then, based on the determined address, relocation is performed according to the relocation record relating to the static storage record and the dynamic storage record in the object file.

In the linking process of the object file, in addition to the above operations related to the secure data section, other conventional linking operations may also be performed, the description of which is omitted here. Finally, the executable file having the new secure data section is generated.

When the generated executable file is loaded into the memory to run, the secure data section is updated according to the relevant machine instructions in the executable file. In one embodiment, the updating may include at least updating the memory address and the address offset of the sensitive data in the secure data section. Further, the length of the sensitive data may also be updated. In addition, as the storage information of the static sensitive data and the data type of the dynamic sensitive data are known at compile-time and will not change, they may not be updated at run-time either, but only the memory address and the address offset (optionally, the length as well) of the dynamic sensitive data that are not be acquired at compile-time are updated.

It can be seen from the above description that one or more aspects may accurately determine the sensitive data and trace the sensitive data at run-time, so as to protect the sensitive data at any granularity level, by using the specific identifier to mark the sensitive data during the coding stage of the source file, generating the object file and the executable file having the secure data section for storing the storage information of the sensitive data in the compiling and linking stages, and updating the storage information of the sensitive data at run-time. Moreover, even in the case of a shared memory in a plurality of processes, in the case of a function call and in the case of object inheritance, one or more aspects also avoid the sensitive data leak.

Further, when the method according to one embodiment is actually applied, the execution of the method of one embodiment may also be controlled by setting an enable/disable option. Specifically, when the source file is being compiled, it may be determined whether the sensitive data protection is enabled. If the sensitive data protection is enabled, the above process of the sensitive data protection is executed. If the sensitive data protection is not enabled, the specific identifier of the sensitive data is ignored, and the compiling is performed in the conventional compiling way, when the source file is being complied. In addition, when running the executable file, it may also be determined whether the sensitive data protection is enabled. If the sensitive data protection is enabled, the secure data section is updated at run-time; otherwise, the update is ignored.

FIG. 6 is a flow chart of one example of a method for protecting sensitive data when a core dump is generated according to an embodiment of the present invention. This embodiment is described in detail in conjunction with the drawings. For the same parts as those in the previous embodiments, the description thereof is omitted appropriately.

As shown in FIG. 6, in step S610, when a core dump occurs due to failure of the software product, the computer's memory is scanned to find the secure data section. If the executable file has the secure data section, the secure data section is contained in the memory at run-time of the executable file. The secure data section saves the storage information of the sensitive data, which includes the data type, memory address, address offset and length of the sensitive data, as examples.

Next, after the secure data section is found, in step S620, the corresponding sensitive data is acquired according to the storage information of the sensitive data of the found secure data section. As mentioned above, the storage information of the sensitive data includes the memory address and the address offset of the sensitive data; thus the actual address of the sensitive data in the memory may be acquired, so as to find the corresponding sensitive data.

Then in step S630, the acquired sensitive data is processed to hide the sensitive data. Such hiding process should not be reversible, in one embodiment, so as to prevent the reverse process on the hidden sensitive data. The hiding process may either replace the sensitive data by using an existing random replacement algorithm, or obscure the sensitive data by using an existing encryption algorithm such as the dynamic secret-key algorithm.

Finally in step S640, a core dump file is generated, in which there is no sensitive data.

It can be seen from the above description that one or more aspects ensure no sensitive data leak during the core dump by locating the sensitive data according to the secure data section in the memory.

Figure 7:
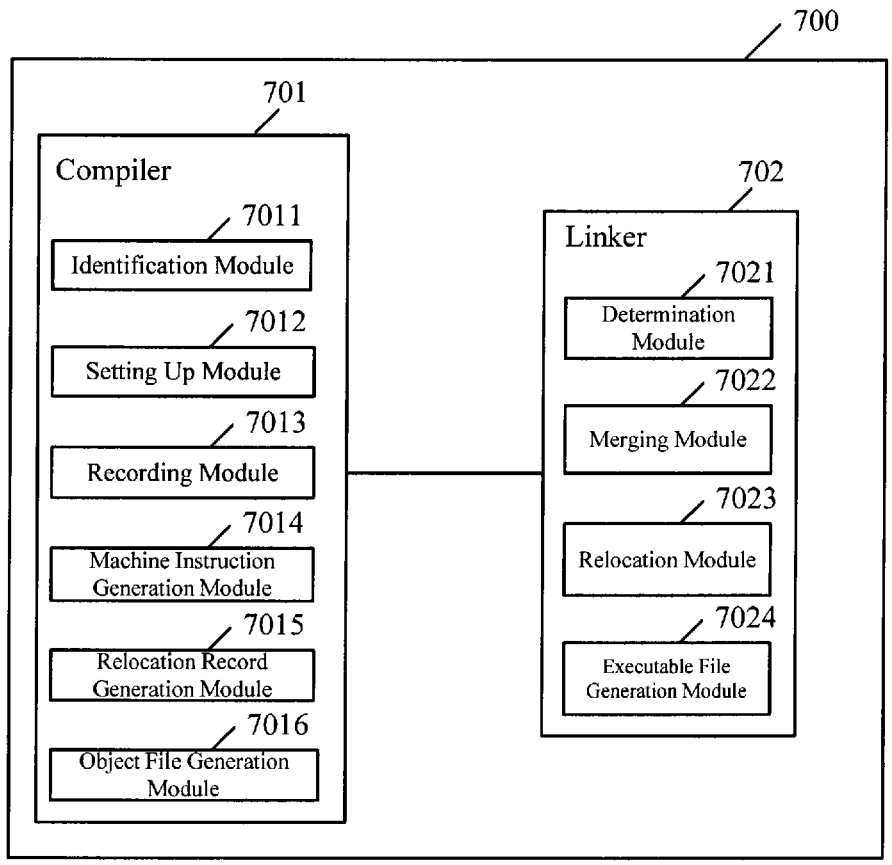
FIG. 7 is a schematic block diagram of one example of a device for protecting sensitive data in a software product according to an embodiment of the present invention.

FIG. 7 is a schematic block diagram of a device 700 for protecting sensitive data in a software product according to an embodiment of the present invention. One embodiment is described in detail in conjunction with the drawing. For the same parts as those in the previous embodiments, the description thereof is omitted appropriately.

As shown in FIG. 7, device 700 of one embodiment may include: a compiler 701 configured to compile a source file of the software product to generate an object file, wherein the source file includes at least one piece of sensitive data marked with a specific identifier, and the object file has a secure data section for saving storage information of the at least one piece of sensitive data at compile-time and run-time; and a linker 702 configured to link the object file generated by compiler 701 to generate an executable file, wherein the executable file updates the secure data section at run-time.

In one embodiment, in the source file, the specific identifier for marking the sensitive data may be set prior to the data type of the sensitive data.

When the source file is input to compiler 701, in compiler 701, an identification module 7011 may identify the sensitive data from the source file according to the specific identifier. Further, identification module 7011 may also identify the data associated with the sensitive data, as the indirect sensitive data. Next, a setting up module 7012 may set up a secure data section. A pointer to the secure data section is saved in the file header of the object file. The secure data section may include a header and a record section, used for saving the storage information of the sensitive data and the indirect sensitive data. In one embodiment, the header may include an identifier of the secure data section, an amount of the storage information recorded in the record section and a back pointer to the file header. The storage information may include data type, memory address and address offset, as examples. In addition, the storage information may also include the length of the sensitive data or the indirect sensitive data.

As mentioned above, the sensitive data may be divided into static sensitive data pertaining to a static variable and dynamic sensitive data pertaining to a dynamic variable. The stages for acquiring the storage information of the static sensitive data and the dynamic sensitive data are different, so in compiler 701, the static sensitive data and the dynamic sensitive data are processed differently. For the static sensitive data, a recording module 7013 records the storage information of the static sensitive data in the secure data section, as the static storage record. For the dynamic sensitive data, a machine instruction generation module 7014 may generate a machine instruction for recording the storage information of the dynamic sensitive data at run-time in the secure data section as the dynamic storage record. Further, machine instruction generation module 7014 may also generate a machine instruction for removing the corresponding dynamic storage records when the dynamic sensitive data is released. In addition, a relocation record generation module 7015 generates a relocation record for relocating the address of the static storage record and the dynamic storage record in the secure data section when a plurality of object files is linked. Finally, an object file generation module 7016 generates an object file having the secure data section.

Similarly, for the static indirect sensitive data, recording module 7013 records the storage information of the static indirect sensitive data in the secure data section as the static storage record. For the dynamic indirect sensitive data, machine instruction generation module 7014 may generate a machine instruction for recording the storage information of the dynamic indirect sensitive data in the secure data section at run-time as the dynamic storage record, and a machine instruction for removing the corresponding dynamic storage records when the dynamic indirect sensitive data is released.

The generated object file is provided to linker 702 for linking. In linker 702, a determination module 7021 determines whether there is a plurality of object files to be linked. If there is a plurality of object files, a merging module 7022 merges the plurality of object files. Then, a relocation module 7023 relocates a new secure data section of the merged object file. Finally, an executable file generation module 7024 generates an executable file having the new secure data section.

Figure 8:
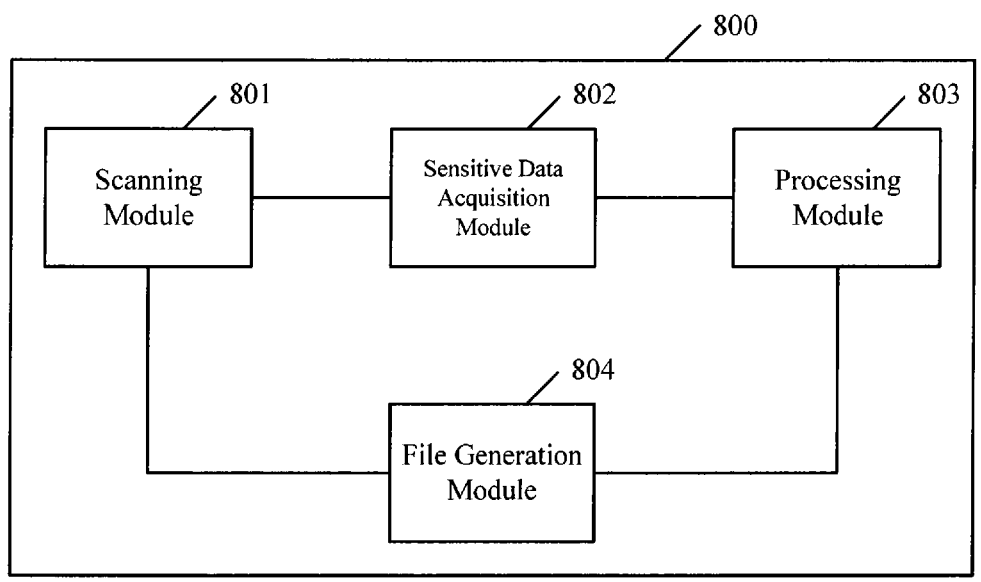
FIG. 8 is a schematic block diagram of one example of a device for protecting sensitive data when a core dump is generated according to an embodiment of the present invention.

FIG. 8 is a schematic block diagram of one example of a device 800 for protecting sensitive data when a core dump is generated according to an embodiment of the present invention. One embodiment is described in detail in conjunction with the drawing. For the same parts as those in the previous embodiments, the description thereof is omitted appropriately.

As shown in FIG. 8, a device 800 of this embodiment may include: a scanning module 801 configured to scan a computer's memory to find a secure data section in the memory, wherein the secure data section saves storage information of the sensitive data; a sensitive data acquisition module 802 configured to acquire the sensitive data, according to the storage information of the sensitive data in the found secure data section; a processing module 803 configured to process the acquired sensitive data to hide the sensitive data; and a file generation module 804 configured to generate a core dump file.

In one embodiment, after the secure data section has been found by scanning module 801, since the secure data section saves the storage information of the sensitive data, which includes, for instance, the data type, memory address, address offset and length of the sensitive data, sensitive data acquisition module 802 may acquire the actual address of the sensitive data in the memory according to the memory address and the address offset of the sensitive data, so as to acquire the sensitive data. Then, processing module 803 may replace the sensitive data by using a random replacement algorithm, or obscure the sensitive data by using an existing encryption algorithm such as the dynamic secret-key algorithm, so that the core dump file generated by file generation module 804 does not contain any sensitive data.

The previous description of the methods as shown in FIG. 2, FIG. 3 and FIG. 6 in conjunction with the specific examples may be referred to for the specific implementation modes of device 700 for protecting the sensitive data in a software product and device 800 for protecting the sensitive data when generating a core dump, which will not be repeated herein.

As described herein, there is provided a method for protecting sensitive data in a software product, which comprises: compiling a source file of the software product to generate an object file, wherein the source file includes at least one piece of sensitive data marked with a specific identifier, and the object file has a secure data section for saving storage information of the at least one piece of sensitive data at compile-time and run-time; and linking the object file to generate an executable file, wherein the executable file updates the secure data section at run-time.

According to another aspect of the present invention, there is provided a method for protecting sensitive data when a core dump is generated, which comprises: scanning a computer's memory to find a secure data section in the memory, wherein the secure data section saves storage information of the sensitive data; acquiring the sensitive data according to the storage information of the sensitive data in the found secure data section; processing the sensitive data to hide the sensitive data; and generating a core dump file.

According to still another aspect of the present invention, there is provided a device for protecting sensitive data in a software product, which comprises: a compiler configured to compile a source file of the software product to generate an object file, wherein the source file includes at least one piece of sensitive data marked with a specific identifier, the object file has a secure data section for saving storage information of the at least one piece of sensitive data at compile-time and run-time; and a linker configured to link the object file to generate an executable file, wherein the executable file updates the secure data section at run-time.

According to still another aspect of the present invention, there is provided a device for protecting sensitive data when a core dump is generated, which comprises: a scanning module configured to scan a computer's memory to find a secure data section in the memory, wherein the secure data section saves storage information of the sensitive data; a sensitive data acquisition module configured to acquire the sensitive data according to the storage information of the sensitive data in the found secure data section; a processing module configured to process the sensitive data to hide the sensitive data; and a file generation module configured to generate a core dump file.

Embodiments of the present invention can accurately locate and trace the sensitive data, and avoid sensitive data leak during the core dump, thereby improving security.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   compiling, by one or more processors, a source file to generate an executable file, wherein the compiling comprises determining a value of an option, and wherein the source file comprises instructions to update, at run-time of the executable file, a secure data section of a memory of a computer, to include storage information of sensitive data indicating a location of the sensitive data;
   based on determining that the value is set to enable protection of the sensitive data, updating, at run-time of the executable file, based on the instructions, by the one or more processors, the secure data section of the memory of the computer, to include the storage information of the sensitive data indicating the location of the sensitive data; and
   based on determining that the value is set to disable protection of the sensitive data, ignoring, by the one or more processors, the instructions.

2. The computer-implemented method of claim 1, further comprising:
   setting, by the one or more processors, the option to enable or disable protection of sensitive data.

3. The computer-implemented method of claim 1, wherein the value is set to enable protection of the sensitive data, the method further comprising:
   scanning, by the one or more processors, the memory of the computer to find the secure data section in the memory;
   acquiring, by the one or more processors, the sensitive data, by utilizing the storage information to locate the sensitive data corresponding to the storage information;
   processing, by the one or more processors, the sensitive data to hide the sensitive data, wherein hiding the sensitive data is not reversible; and
   generating, by the one or more processors, a core dump file, wherein the core dump file does not comprise the sensitive data.

4. The method according to claim 3, wherein the storage information includes at least a data type, a memory address and an address offset of the sensitive data in the secure data section.

5. The method according to claim 3, wherein the processing of the sensitive data to hide the sensitive data includes hiding the sensitive data by using at least one of a random replacement algorithm and an encryption algorithm.

6. The method according to claim 1, wherein the secure data section includes a header and a record section, wherein a pointer to the secure data section is saved in a file header of an object file, wherein the executable file is generated from the object file, and the header includes an identifier of the secure data section, an amount of the storage information recorded in the record section and a back pointer to the file header.

7. The method according to claim 1, wherein the compiling further comprises:
  determining that the value is set to enable protection of the sensitive;
  scanning, by the one or more processors, the memory of the computer to find the secure data section in the memory;
  acquiring, by the one or more processors, the sensitive data, by utilizing the storage information to locate the sensitive data corresponding to the storage information;
  processing, by the one or more processors, the sensitive data to hide the sensitive data, wherein hiding the sensitive data is not reversible; and
  generating, by the one or more processors, a core dump file, wherein the core dump file does not comprise the sensitive data.

8. The method according to claim 7, further comprising:
  prior to scanning the memory, determining by the one or more processors, that a software product executed by the one or more processors has failed.

9. The method according to claim 7, wherein the processing of the sensitive data to hide the sensitive data includes obscuring the sensitive data by using an encryption algorithm.

10. The method according to claim 9, wherein the encryption algorithm comprises a dynamic secret-key algorithm.

11. A system comprising:
  a memory;
  one or more processors in communication with the memory;
  and program instructions executable by the one or more processors via the memory to perform a method, the method comprising:
  compiling, by the one or more processors, a source file to generate an executable file, wherein the compiling comprises determining a value of an option, and wherein the source file comprises instructions to update, at run-time of the executable file, a secure data section of a memory of a computer, to include storage information of sensitive data indicating a location of the sensitive data;
  based on determining that the value is set to enable protection of the sensitive data, updating, at run-time of the executable file, based on the instructions, by the one or more processors, the secure data section of the memory of the computer, to include the storage information of the sensitive data indicating the location of the sensitive data; and
  based on determining that the value is set to disable protection of the sensitive data, ignoring, by the one or more processors, the instructions.

12. The system according to claim 11, the method further comprising:
  setting, by the one or more processors, the option to enable or disable protection of sensitive data.

13. The system according to claim 11, wherein the value is set to enable protection of the sensitive data, the method further comprising:
  scanning, by the one or more processors, the memory of the computer to find the secure data section in the memory;
  acquiring, by the one or more processors, the sensitive data, by utilizing the storage information to locate the sensitive data corresponding to the storage information;
  processing, by the one or more processors, the sensitive data to hide the sensitive data, wherein hiding the sensitive data is not reversible; and
  generating, by the one or more processors, a core dump file, wherein the core dump file does not comprise the sensitive data.

14. The system of claim 13, wherein the storage information includes at least a data type, a memory address and an address offset.

15. The system according to claim 13, wherein the processing comprises hiding the sensitive data by using at least one of a random replacement algorithm and an encryption algorithm.

16. The system according to claim 13, wherein the secure data section includes a header and a record section, wherein a pointer to the secure data section is saved in a file header of an object file, wherein the executable file is generated from the object file, and the header includes an identifier of the secure data section, an amount of the storage information recorded in the record section and a back pointer to the file header.

17. The system according to claim 13, the method further comprising:
  prior to scanning the memory, determining by the one or more processors, that a software product executed by the one or more processors has failed.

18. A computer program product comprising:
  a computer readable storage medium readable by one or more processors and storing instructions for execution by the one or more processors for performing a method comprising:
  compiling, by the one or more processors, a source file to generate an executable file, wherein the compiling comprises determining a value of an option, and wherein the source file comprises instructions to update, at run-time of the executable file, a secure data section of a memory of a computer, to include storage information of sensitive data indicating a location of the sensitive data;
  based on determining that the value is set to enable protection of the sensitive data, updating, at run-time of the executable file, based on the instructions, by the one or more processors, the secure data section of the memory of the computer, to include storage the information of the sensitive data indicating the location of the sensitive data; and
  based on determining that the value is set to disable protection of the sensitive data, ignoring, by the one or more processors, the instructions.

19. The computer program product according to claim 18, the method further comprising:
  setting, by the one or more processors, the option to enable or disable protection of sensitive data.

20. The computer program product according to claim 18, wherein the value is set to enable protection of the sensitive data, the method further comprising:
  scanning, by the one or more processors, the memory of the computer to find the secure data section in the memory;
  acquiring, by the one or more processors, the sensitive data, by utilizing the storage information to locate the sensitive data corresponding to the storage information;
  processing, by the one or more processors, the sensitive data to hide the sensitive data, wherein hiding the sensitive data is not reversible; and
  generating, by the one or more processors, a core dump file, wherein the core dump file does not comprise the sensitive data.

* * * * *